(12) United States Patent
Cheung

(10) Patent No.: US 8,215,613 B2
(45) Date of Patent: Jul. 10, 2012

(54) VIRTUAL VARIABLE VALVE INTAKE AND EXHAUST FOR THE INTERNAL COMBUSTION ENGINE

(76) Inventor: Neil Cheung, Laguna Niguel, CA (US)

( * ) Notice: Subject to any disclaimer, the term of this patent is extended or adjusted under 35 U.S.C. 154(b) by 1069 days.

(21) Appl. No.: 12/156,928

(22) Filed: Jun. 6, 2008

(65) Prior Publication Data

US 2009/0302252 A1 Dec. 10, 2009

(51) Int. Cl.
*F16K 3/00* (2006.01)

(52) U.S. Cl. .......................................... 251/212; 251/248

(58) Field of Classification Search .................. 251/212, 251/248, 231
See application file for complete search history.

(56) References Cited

U.S. PATENT DOCUMENTS

| | | | | |
|---|---|---|---|---|
| 1,595,657 A * | 8/1926 | Halloran | ................... | 137/565.12 |
| 2,037,663 A * | 4/1936 | Lalor | ............................ | 251/212 |
| 2,321,336 A * | 6/1943 | Tondreau | ....................... | 251/212 |
| 2,649,272 A * | 8/1953 | Barbato | ......................... | 251/212 |
| 2,830,617 A * | 4/1958 | Brown | ........................... | 137/553 |
| 3,101,736 A * | 8/1963 | Egger | ........................... | 137/242 |
| 4,094,492 A * | 6/1978 | Beeman et al. | ................. | 251/212 |
| 4,232,595 A * | 11/1980 | Cox | .................................... | 454/29 |
| 5,819,540 A * | 10/1998 | Massarani | ....................... | 60/732 |
| 6,375,155 B1 * | 4/2002 | Janssens | ........................ | 251/212 |
| 6,605,176 B2 * | 8/2003 | Tzu | .......................... | 156/345.26 |
| 6,666,237 B2 * | 12/2003 | De Antoni Migliorati et al. | .............................. | 141/286 |
| 6,796,328 B2 * | 9/2004 | Myles | ........................... | 137/557 |
| 6,896,240 B2 * | 5/2005 | Wijaya | ........................... | 251/212 |
| 7,819,728 B2 * | 10/2010 | Beckley | ......................... | 454/155 |
| 7,842,898 B2 * | 11/2010 | Adams | ......................... | 219/121.5 |
| 2006/0112773 A1 * | 6/2006 | Hedtke | ....................... | 73/861.61 |

* cited by examiner

*Primary Examiner* — John Bastianelli
*Assistant Examiner* — Matthew W Jellett
(74) *Attorney, Agent, or Firm* — Morland C. Fischer

(57) ABSTRACT

A cylindrical housing assembly with an adjustable aperture or orifice using an iris shutter system to control the volumetric flow of fuel mixture or exhaust gas by movable blades or leaflets arranged inside a sealed enclosure which is operated by external actuators connected in series.

10 Claims, 9 Drawing Sheets

VIRTUAL VARIABLE VALVE INTAKE AND EXHAUST FOR THE INTERNAL COMBUSTION ENGINE

BACKGROUND OF THE INVENTION

The traditional poppet valves fitted to the ports of an internal combustion engine are reliable and durable, and capable of withstanding the pressurized compression of the chamber and the subsequent explosion of the air fuel mixture. However, such valves are not amenable to adjusting or metering the flow of the air fuel mixture with the reciprocating motion that is produced by a fixed cam or pushrod profile. Whereas an iris shutter can be amenable to adjusting or metering the flow, it does not withstand the explosion of the combustion chamber. Thus by combining these two, the best feature of each can be used to produce the ideal intake and exhaust valve design.

Reference can be made to U.S. Pat. No. 4,094,492 issued Jun. 13, 1978 for an example of a variable orifice iris shutter system for controlling gas flow.

SUMMARY OF THE INVENTION

The present invention relates to a cylindrical housing assembly including an iris shutter system with linkage devices to allow easy external control to vary and adjust the flow of a gaseous mixture into or out of the intake or exhaust port of an internal combustion engine fitted with conventional poppet valves.

The iris shutter system is provided with overlapping blades which are similar in its principle of operation to the well known shutter used in photography to control the amount of light passing through the lenses. Its use for controlling the flow of gaseous mixture is shown in U.S. Pat. No. 4,094,492. Therefore the simplicity and reliability of the iris shutter system are well established and proven.

DETAILED DESCRIPTION OF THE INVENTION

Figure 1:
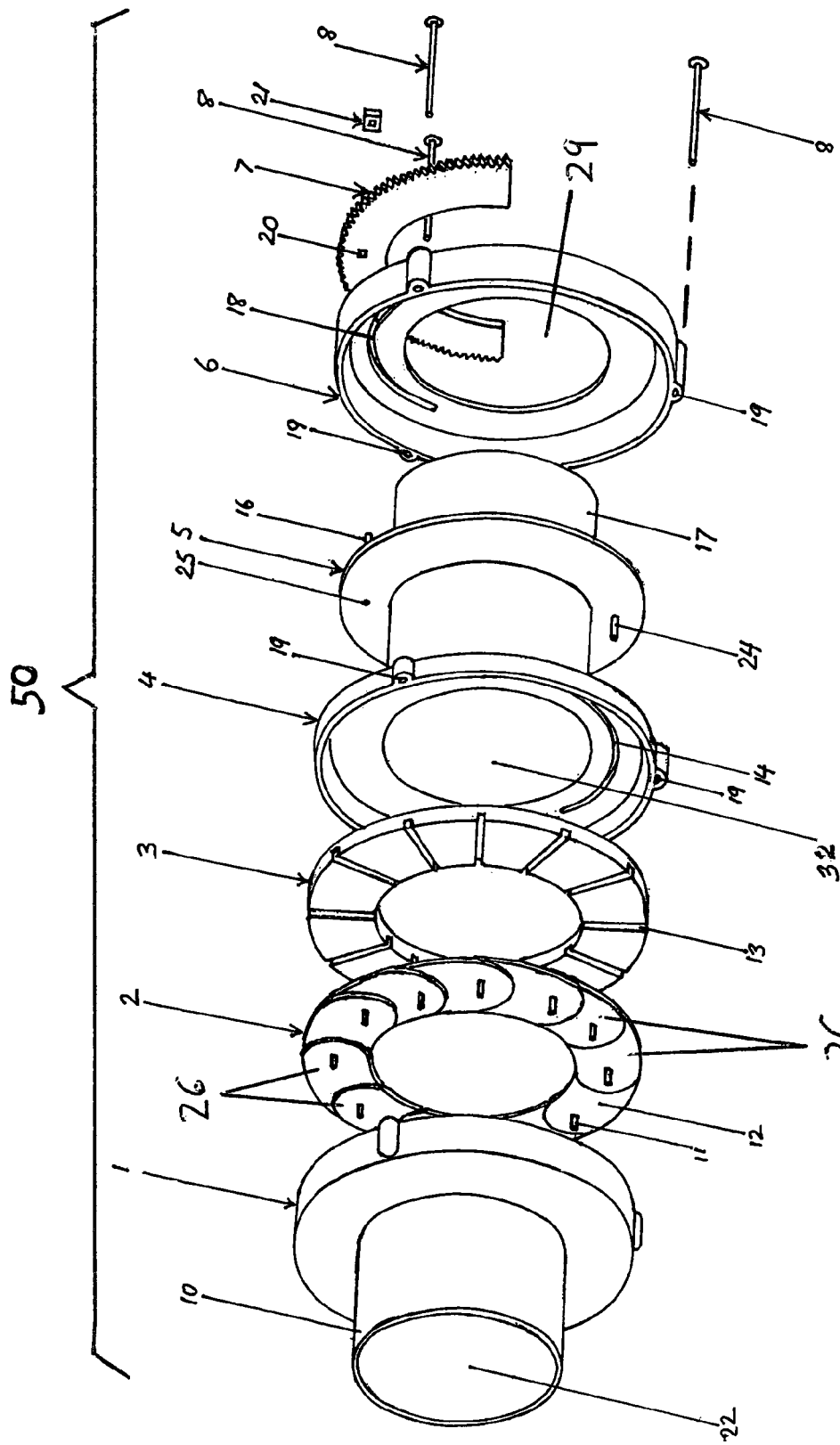
FIG. 1 shows an exploded view of a cylindrical housing assembly for an internal combustion according to a preferred embodiment of the present invention fore to aft from left to right viewing.

Referring concurrently to FIGS. 1-9 of the drawings, the apparatus or device to be described is connected to an internal combustion engine via an entry portal opening 22 and an exit portal opening 32 for the ingress and egress of gaseous mixture such as between the fuel injector port upstream and the poppet valve leading to the combustion chamber downstream, or is connected between the exhaust poppet valve upstream and the exhaust pipe downstream (not shown). The device can be reversed in its polarity for placement in the said locations with identical function.

The combustible gaseous mixture (or the exhaust gas) will flow through the entry portal opening 22 of a round cylindrical housing assembly 50 composed of three fixed separate round cylindrical casings 1, 4 and 6 interposed with optional ring gaskets (not shown): a first or front cylindrical casing 1 with the entry portal opening 22 within an entry conduit 10, a second or middle cylindrical casing 4 with a lead-out exit conduit 17 carrying the exit portal opening 32, and a third or rear cylindrical casing 6 with a slightly larger opening 29 to accommodate the presence of the lead out exit conduit 17 of the middle casing 4. These are attached to each other by screws or bolts 8 driven into drilled holes 19 of these adjacent front, middle and rear casings 1, 4 and 6 with the optional interposed gaskets (not shown) in between. The entry conduit 10 of the first (or front) casing 1 on one end of the housing assembly 50 is connectible to the external duct from the outside components (not shown). The lead out exit conduit 17 of the second (or middle) casing 4 will exit through the central opening 29 of the third (or rear) casing 6 containing the optional interposed gasket (not shown). The lead out exit conduit 17 of the exit end of housing assembly 50 is connectible to the external duct from the outside components (not shown). An iris shutter system 2 and the corresponding gaskets with the actuating mechanisms are contained inside the adjacent first and second (front and middle) cylindrical casings 1 and 4.

A gas receiving primary surface 12 of each of a plurality of curved blades 26 (best shown in FIGS. 3A, 3B and 3C) of the iris shutter system 2 is fitted with a pinion 11, or with a screw countersunk through the reverse surface 12' of the blade 26 near the end thereof such that the reverse surface 12' is necessarily flat or flushed, thus allowing the plurality of individual blades 26 to overlap adjacent blades without obstruction. The curvature of each blade 26 will conform to the interior dimension of the cylindrical shape of the cylindrical casings 1 and 4.

Figure 2:
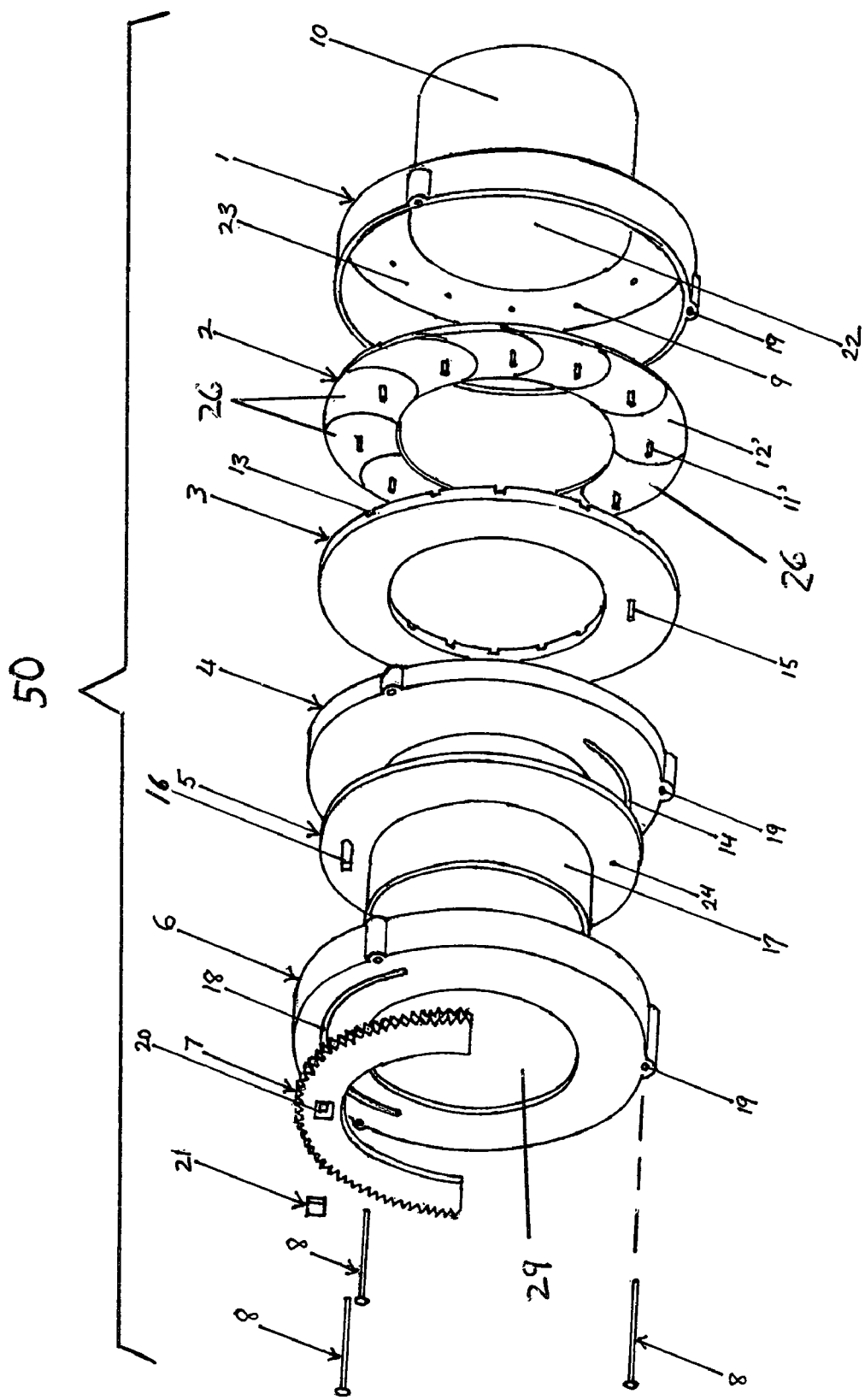
FIG. 2 shows an exploded view of the cylindrical housing assembly of FIG. 1 aft to fore from left to right viewing.
Figure 3C:
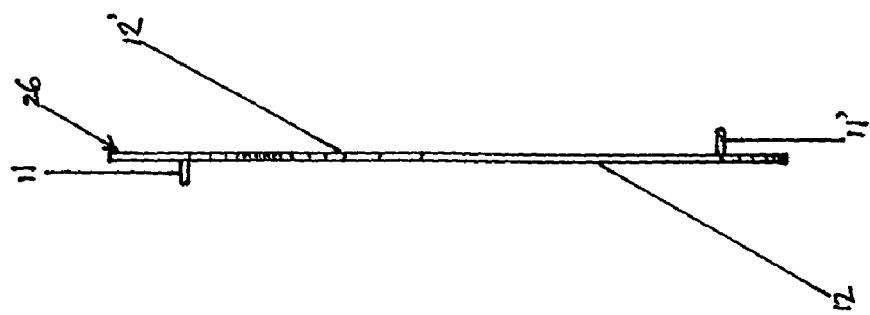
FIGS. 3A, 3B and 3C show the individual curved blade element from an iris shutter system of the cylindrical housing assembly viewed perpendicularly, obliquely and sideways.
Figure 3B:
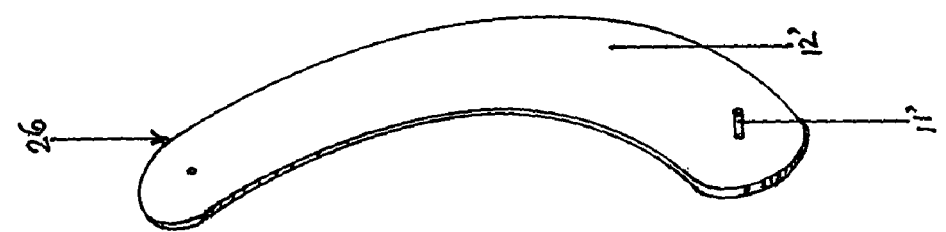
Figure 3A:
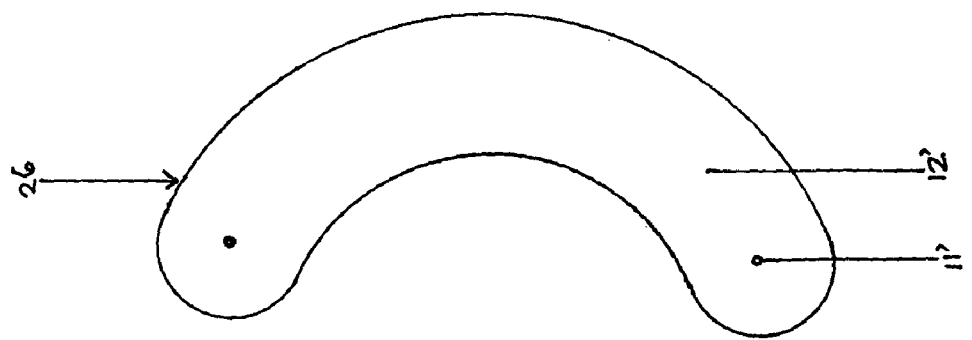
Figure 4:
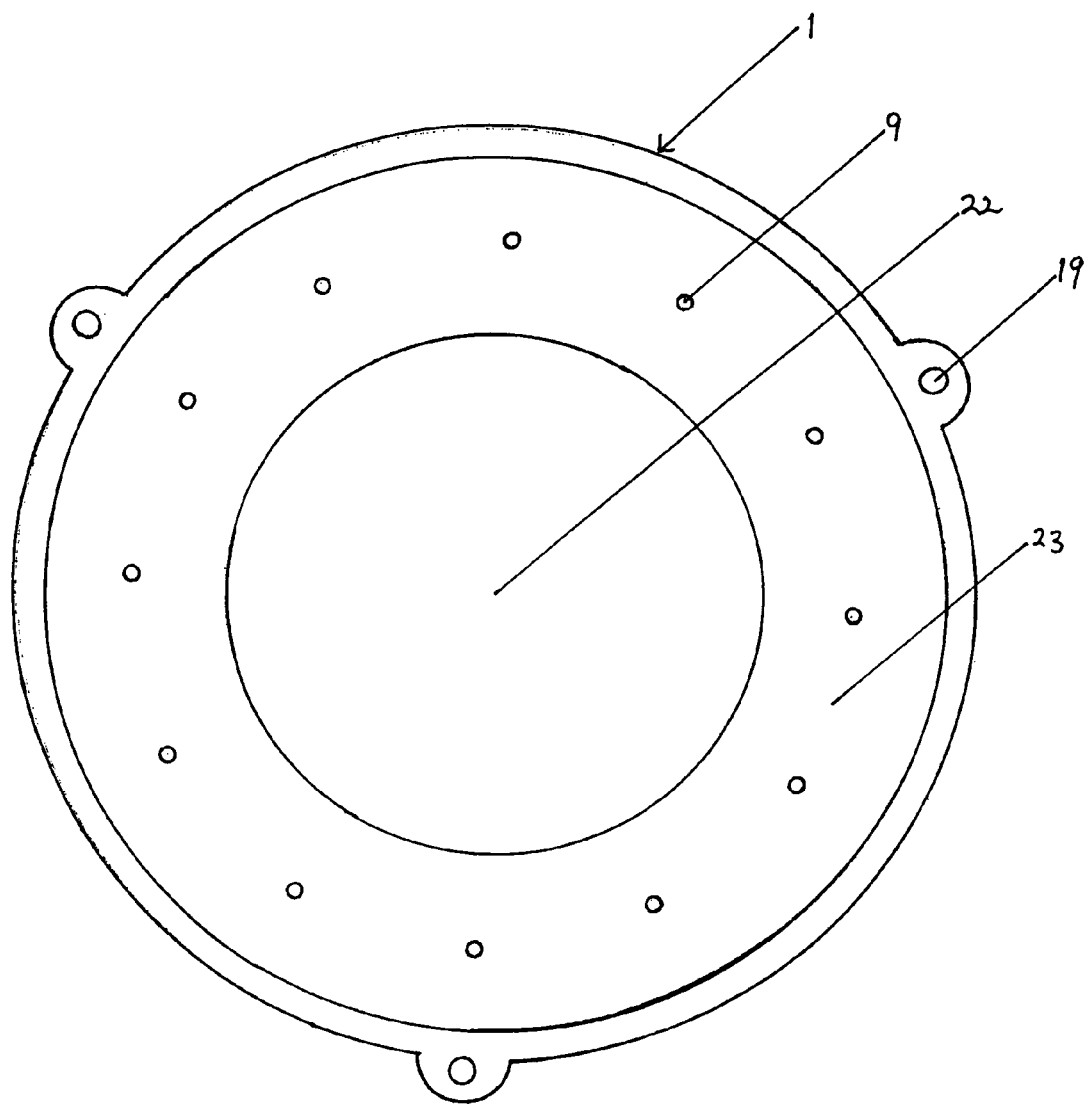
FIG. 4 shows the first or front casing of the cylindrical housing assembly viewed from the backside.

Each blade 26 is pivoted by the pinion 11 along the periphery on the interior side 23 (of FIG. 2) of the cylindrical first (or front) casing 1 when the pinions 11 are anchored into drilled holes 9 (of FIG. 4) created along the periphery of casing 1 such that each blade 26 of the iris shutter system 2 is overlapped by the preceding blade, and each blade 26 overlaps the next succeeding blade in a recursive pattern when the entire set of blades are assembled in a clockwise manner as shown in FIGS. 1 and 2.

The reverse surface 12' of each blade 26 will face a rotary hollow-center disc 3 (an annular or donut shaped disc) with the size and shape conforming to the interior of the cylindrical casing 1 and with radially cut grooves 13 that will guide either a second small pinion 11' (of FIG. 2) or a countersunk screw created to protrude from the reverse surface 12' near the opposite end of the blade 26. The gas receiving primary surface 12 of blade 26 which is on the opposite side the second pinion 11' is necessarily flat or flushed, thus allowing for overlapping with an adjacent blade with no obstruction.

Figure 5:
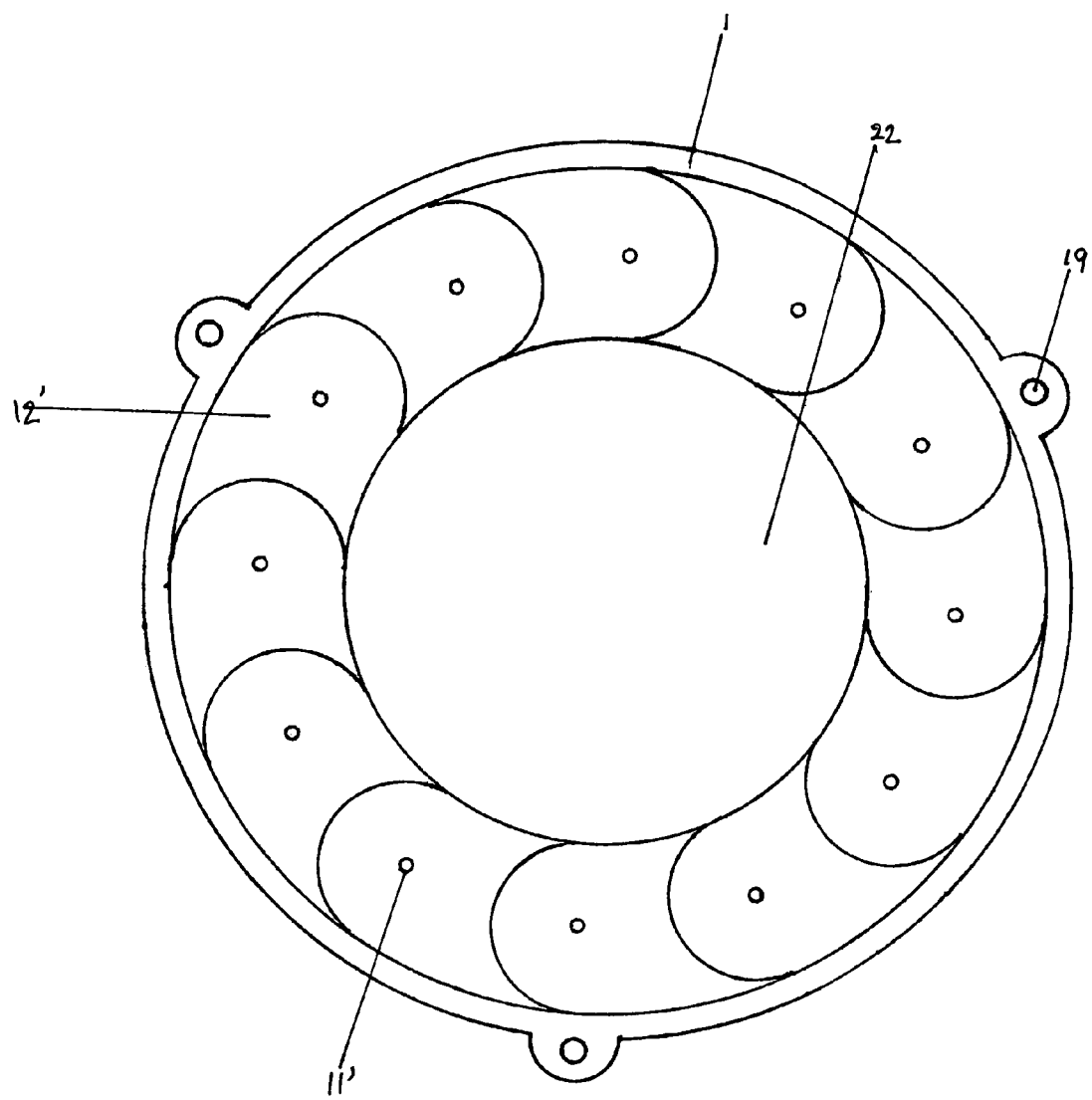
FIG. 5 shows the first or front casing of the cylindrical housing assembly assembled with the blade elements of an iris shutter system in the fully opened position viewed from the backside.
Figure 6:
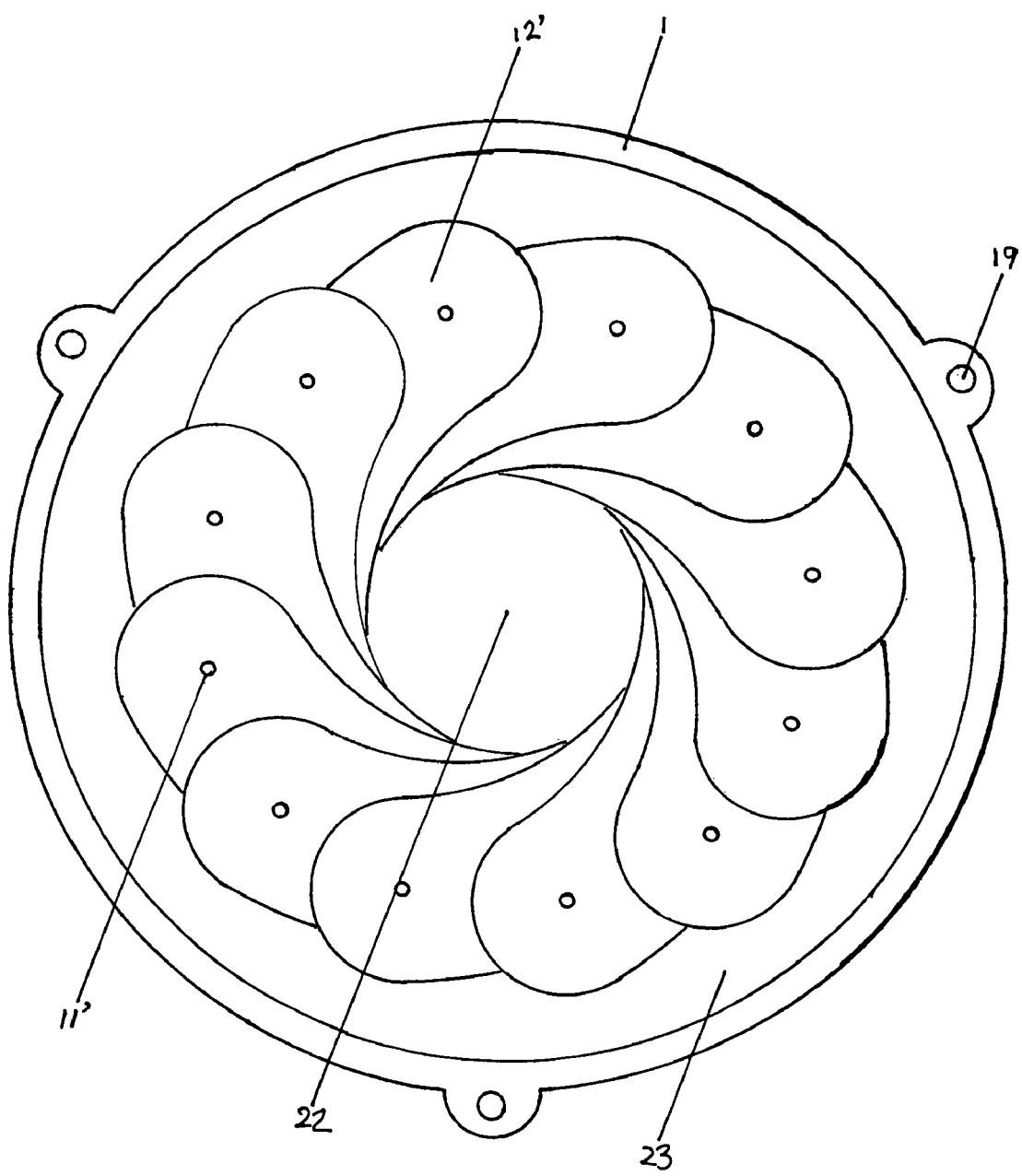
FIG. 6 shows the first or front casing assembled with the blade elements of the iris shutter system partially in the closed position viewed from the backside.
Figure 7:
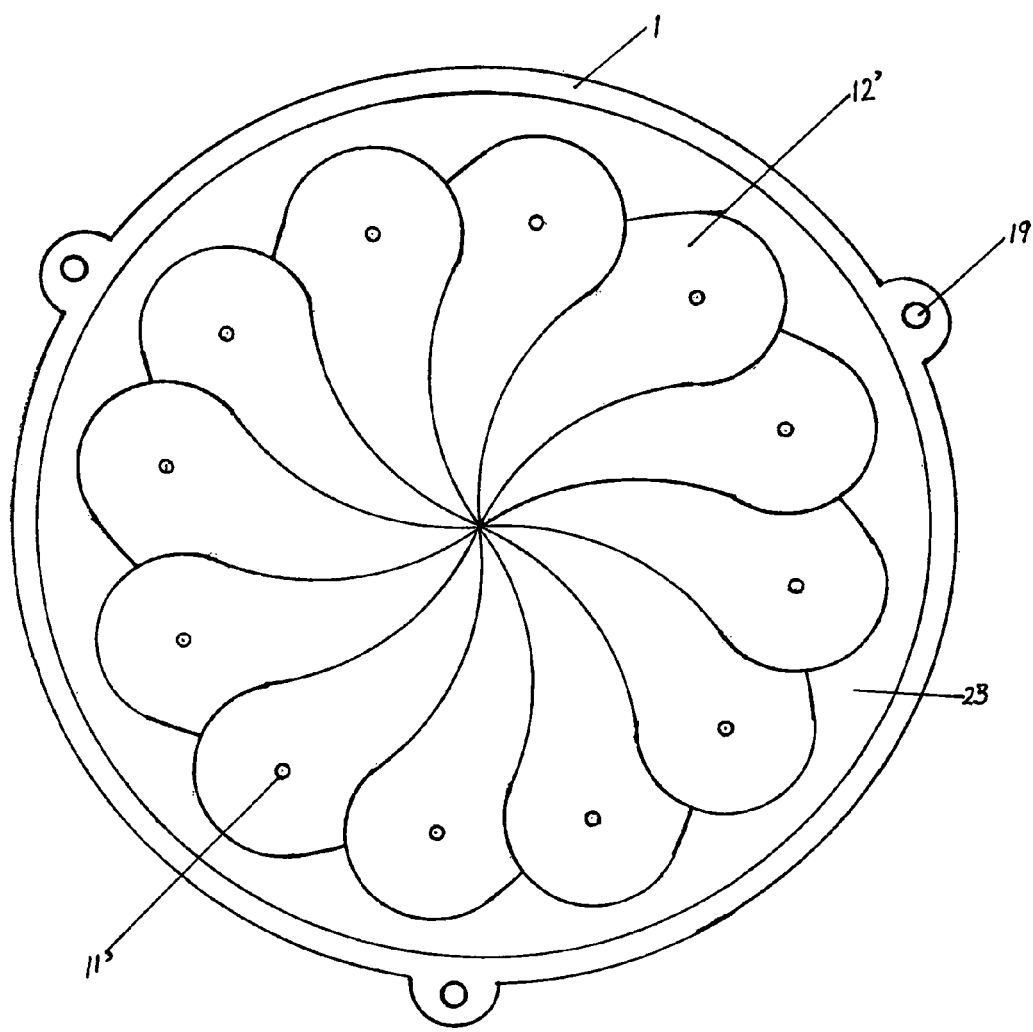
FIG. 7 shows the first or front casing assembled with the blade elements of the iris shutter system in the fully closed position viewed from the backside.
Figure 8:
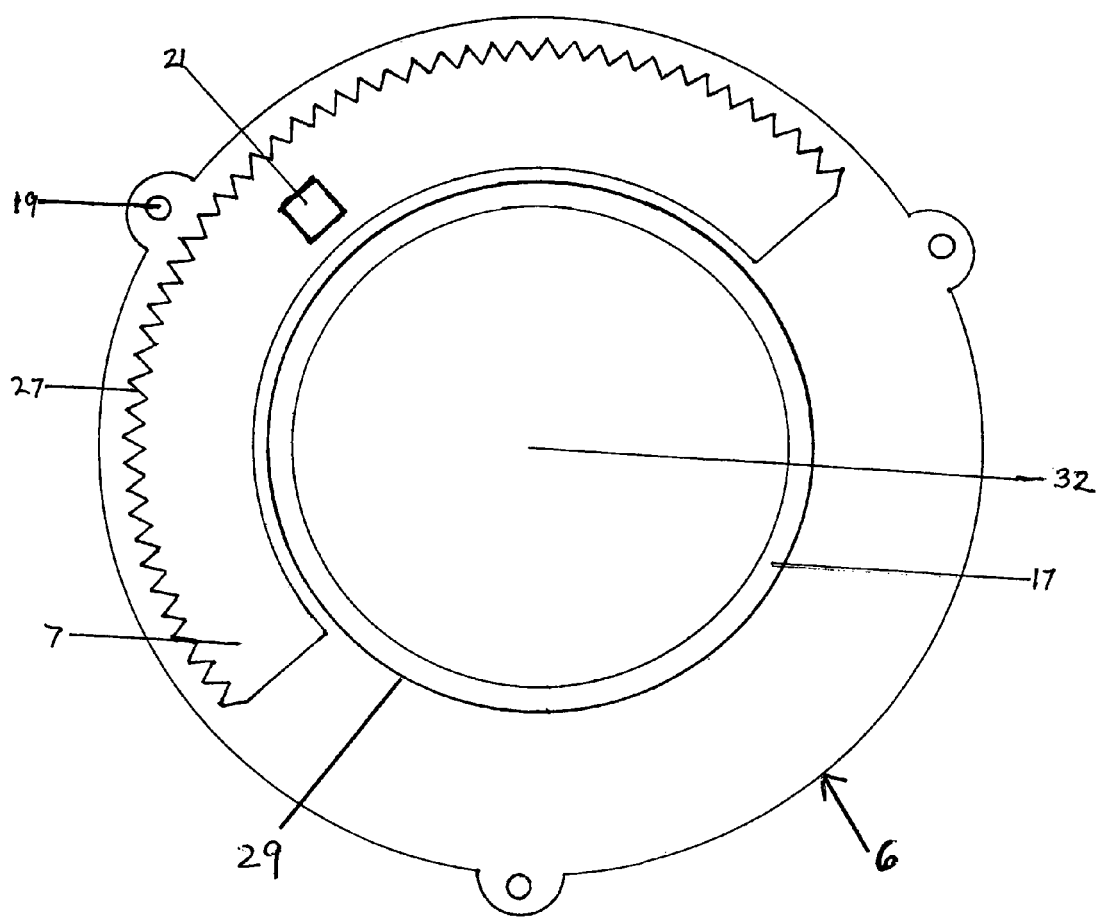
FIG. 8 shows a rear view of the cylindrical housing assembly with an arcuate cog-tooth gear situated in the opened position of the iris shutter system for augmented gas flow.
Figure 9:
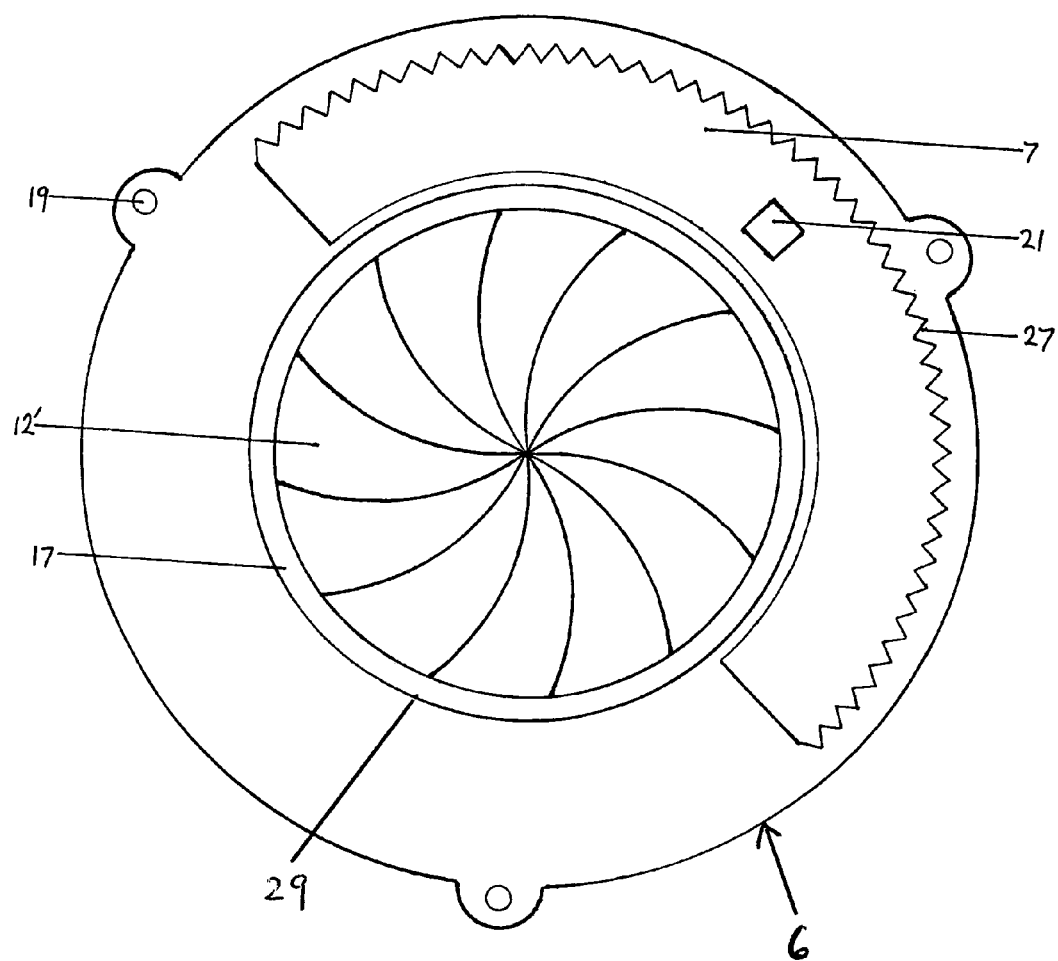
FIG. 9 shows the rear view of the cylindrical housing assembly with the arcuate cog-tooth gear situated in the closed position of the iris shutter system for the cessation of gas flow.

The second pinion 11' or screw protrusion of each blade 26 of the iris shutter system 2 will glide within the grooves 13 such that the rotation of the rotary annular disc 3 will move the blades 26 centripetally or centrifugally as illustrated by FIGS. 5-7, thus varying the orifice size.

The radially grooved rotary annular disc 3 has a pinion or stent 15 fitted on the reverse surface (best shown in FIG. 2) such that the pinion or stent 15 will exit the second (or middle) casing 4 via an arcuate slot 14 created along the periphery of the second (or middle) casing 4. The protruding pinion or stent 15 is attached by a screw or rivet 24 onto the front or primary surface of a second rotary annular disc 5 with the size and shape conforming to the interior of the third or rear casing 6, such that the second rotary annular disc 5 can revolve freely around the lead out exit conduit 17 of the second (or middle) casing 4, together with the first grooved annular disc 3 inside the first cylindrical casing 1 due to the coupling of the pinion or stent 15 to the screw or rivet 24. The said pinion or stent 15 is countersunk into an indentation created on the second rotary annular disc 5 resulting in a secured mounting of the pinion or stent 15. The radially grooved rotary annular disc 3 in the first (or front) casing 1 and the second rotary annular disc 5 in the third (or rear) casing 6 are connected in series by the pinion or stent 15, so that the screw or rivet 24 within the arcuate slot 14 through the second (or middle) casing 4 will function as the gaskets to seal off any gas (combustible air-fuel mixture or exhaust) from escaping.

A second connecting pinion or stent 16 (of FIGS. 1 and 2) on the reverse surface of the second rotary annular disc 5 is created and is positioned at a diametrically opposed location from the first pinion or stent 15 on the said primary surface of disc 5. The second pinion or stent 16 is attached by a screw or rivet 25 countersunk on the second rotary annular disc 5 resulting in a flat or flushed mounting. The second pinion or stent 16 will exit via a separate arcuate slot 18 created along the third (or rear) casing 6 at a diametrically opposed position to the arcuate slot 14 of the said second (or middle) casing 4. The second pinion or stent 16 is attached to an outside cog-tooth arc 7 (or an arcuate gear) with the size and shape conforming to the third (or rear) casing 6 by a squared off end of the second pinion or stent 16 inserted into a square hole and indentation 20 created on the toothed arc 7. An optional attachment screw or cap 21 placed into the indentation 20 is used to anchor the pinion or stent 16 securely onto the toothed arc 7. The toothed arc 7 will revolve around the lead out exit conduit 17 of the second (middle) casing 4 when acted upon by an external cog gear, spiral gear, toothed lever, chain or belt (not shown) onto the teeth 27 (of FIGS. 8 and 9) of the outside cog-tooth arc 7.

Therefore by motion linkages from any external device mechanism fitted with chain, belt or gear drive, the serially connected discs 3 and 5 and arc 7 can be made to revolve and rotate within the first, second and third casings 1, 4 and 6 of housing assembly 50. The rotation of the cog-tooth arc 7 will rotate the second rotary annular disc 5, which will rotate the first grooved rotary annular disc 3 resulting in the blades 26 of the iris shutter system 2 moving centripetally or centrifugally, thus adjusting the orifice size of the said iris shutter system inside the device.

The second rotary annular disc 5 in the third (or rear) casing 6 and the cog-tooth arc 7 outside of the third (or rear) casing 6 will function as gaskets to seal off any gaseous medium from escaping. In addition, optional gasket rings between the casings and optional gas sealant type medium can be added to the rear casing 6 to further seal off gas escaping or blow-by.

Achieving a variable valve lift of the poppet valves for the traditional overhead valve engine can be very complex due to the complicated mechanism that converts the action of the fixed profile crankshaft and pushrod inside the engine block into the variable lifting motion of the poppet valves. In addition, the manufacturing of such a mechanism can be complicated as well. However, with the independently operated volumetric control apparatus as disclosed herein used in conjunction with the poppet valves, a variable valve lift can be simulated which is similar to that of the complex overhead cam design. The variable flow of fuel mixture or exhaust gas can be controlled independently but operated according to some pre-specified values. Rapid motion and response of the low inertia mass of the iris blades 26 can be achieved manually or with electro-mechanical, pneumatic or hydraulic assist such that the flow volume can be adjusted in real time synchronous to the opening and closing of the poppet valves during the ingress or egress of the gases to and from the combustion chamber. The technical importance and benefits of an instantaneous adjustable control of the flow to gain a better combustion efficiency, as well as the control of exhaust gas recirculation for pollution reduction varies with different load and condition.

In addition, the present invention can also be used in overhead cam engines to independently control the flow of gas into and out of a combustion chamber. This may obviate the need for a complex cam profiling necessary to produce the variable valve lift simply by using the independent flow control to augment or attenuate the flow as stated above.

What is claimed:

1. An assembly for controlling the flow of a gas, said assembly comprising:
   a first casing having an entry opening through which to receive the gas to be controlled;
   a second casing having an exit conduit projecting outwardly therefrom, said exit conduit communicating with the entry opening of said first casing such that said exit conduit receives the gas that is received through the entry opening of said first casing;
   a third casing having an exit opening sized to receive the exit conduit of said second casing therethrough;
   an adjustable iris shutter system located between said first and second casings, said iris shutter system having a plurality of blades where each of said blades overlaps an adjacent blade so that said blades surround an orifice through said iris shutter system for the receipt of the gas to be controlled, each of said blades having a front and a back and a pin projecting outwardly from said front and said back, the pins projecting from the fronts of said blades being pivotably connected to said first casing at respective pin holes formed therein;
   a first rotary disc coupled to said adjustable iris shutter system, said first rotary disc having a plurality of radial grooves formed therein, such that the pins projecting from the backs of the plurality of blades of said iris shutter system are slidably received by respective ones of said radial grooves formed in said rotary disc; and
   a second rotary disc surrounding and rotating around the exit conduit said exit conduit projecting through said second rotary disk outwardly from said second casing, said second rotary disc being coupled to said first rotary disc such that a rotation of said second rotary disc around the exit conduit of said second casing is imparted to said first rotary disc to cause said first rotary disc to rotate relative to said first casing, whereby the pins which project from the backs of said plurality of blades of said adjustable iris system slide through respective ones of the radial grooves of said first rotary disc to cause a corresponding change in the size of the orifice surrounded by said plurality of blades in order to control the gas received through said orifice.

2. The assembly recited in claim 1, wherein said first casing has a cylindrical body, said adjustable iris shutter system being received within said cylindrical body.

3. The assembly recited in claim 2, wherein each of the plurality of overlapping blades of said adjustable iris shutter system is curved, whereby said iris shutter system is round to be received within the cylindrical body of said first casing.

4. The assembly recited in claim 2, wherein said first rotary disc is received within the cylindrical body of said first casing at which said first rotary disc is coupled to said adjustable iris shutter system.

5. The assembly recited in claim 4, wherein said third casing has a cylindrical body, said second rotary disc being received within said cylindrical body of said third casing at which to surround and rotate around the exit conduit which projects from said second casing, such that the first rotary disc received within the cylindrical body of said first casing is axially aligned with the second rotary disc received within the cylindrical body of said third casing.

6. The assembly recited in claim 1, wherein said second rotary disc has a first pin projecting therefrom and second casing has a first slot formed therein, the first pin of said second rotary disc having an elongated pin body that is sized to be received through the first slot of said second casing and connected to said first rotary disc, whereby said first and second rotary discs are coupled to one another by means of said pin body so that said first and second rotary discs rotate together.

7. The assembly recited in claim 6, further comprising a toothed gear, said second rotary disc having a second pin projecting therefrom and said third casing having a second slot formed therein, the second pin of said second rotary disc being received through the second slot of said third casing and connected to said toothed gear, whereby said second rotary disc is connected to said toothed gear by means of said second pin.

8. The assembly recited in claim 7, wherein said toothed gear surrounds and is rotatable around the exit conduit of said second casing in response to a rotational force applied to said toothed gear, a rotation of said toothed gear causing said second rotary disc and said first rotary disc coupled to said second rotary disc to rotate to cause said corresponding change in the size of the orifice surrounded by the plurality of blades of said adjustable iris shutter system, said toothed gear and said first and second rotary discs rotating simultaneously with one another.

9. The assembly recited in claim 1, wherein the entry opening through said first casing, the exit conduit of said second casing, and the exit opening of said third casing are axially aligned with each other and with the orifice through said adjustable iris shutter system.

10. The assembly recited in claim 1, wherein said second casing from which said exit conduit projects is located between said first rotary disc and said second rotary disc that surrounds and rotates around said exit conduit, and said second rotary disc is located between said second casing and the exit opening of said third casing.

\* \* \* \* \*